US011901671B2

(12) United States Patent
Tryson

(10) Patent No.: US 11,901,671 B2
(45) Date of Patent: Feb. 13, 2024

(54) CONTACT ASSEMBLY FOR AN ELECTRICAL CONNECTOR

(71) Applicant: TE Connectivity Services GmbH, Schaffhausen (CH)

(72) Inventor: Michael Tryson, Spring Grove, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 78 days.

(21) Appl. No.: 17/513,128

(22) Filed: Oct. 28, 2021

(65) Prior Publication Data

US 2023/0137194 A1 May 4, 2023

(51) Int. Cl.

*H01R 13/6471* (2011.01)
*H01R 13/6582* (2011.01)
*H01R 12/72* (2011.01)
*H01R 13/24* (2006.01)
*H01R 13/6592* (2011.01)
*H01R 43/16* (2006.01)

(52) U.S. Cl.

CPC ......... *H01R 13/6471* (2013.01); *H01R 12/72* (2013.01); *H01R 13/2478* (2013.01); *H01R 13/2485* (2013.01); *H01R 13/6582* (2013.01); *H01R 13/6592* (2013.01); *H01R 43/16* (2013.01)

(58) Field of Classification Search

CPC ................ H01R 13/6471; H01R 12/72; H01R 13/2478; H01R 13/2485; H01R 13/6582; H01R 13/6592; H01R 43/16; H01R 12/716; H01R 12/57; H01R 13/02; H01R 13/40; H01R 13/648

See application file for complete search history.

(56) References Cited

U.S. PATENT DOCUMENTS 2,741,748 A 4/1956 Ensinger
3,286,671 A 11/1966 Fuller
7,393,214 B2 7/2008 DiStefano
8,512,081 B2 8/2013 Stokoe
10,163,845 B2 * 12/2018 Song ....................... H01L 24/85
10,594,085 B2 3/2020 Trout et al.

* cited by examiner

*Primary Examiner* — Briggitte R. Hammond

(57) ABSTRACT

A contact assembly for an electrical connector includes an array of contacts including signal contacts and ground contacts. The ground contacts are interspersed with the signal contacts to provide electrical shielding between corresponding signal contacts. Each signal contact includes a signal contact body having a first side, a second side opposite the first side, a first edge between the first and second sides, and a second edge between the first and second sides opposite the first edge. The signal contact body includes a signal mating end and a signal terminating end. Each signal contact includes a mating ball formed at the signal mating end of the signal contact body. The mating ball is generally spherical shaped. The mating ball and the signal contact body are a homogeneous structure.

20 Claims, 5 Drawing Sheets

CONTACT ASSEMBLY FOR AN ELECTRICAL CONNECTOR

BACKGROUND OF THE INVENTION

The subject matter herein relates generally to electrical connectors.

Electrical connectors are typically used to electrically couple various types of electrical devices to transmit signals between the devices. At least some known electrical connectors include a card edge connector having contacts held in a housing for mating with a circuit card plugged into a card slot of the card edge connector. The contacts include signal contacts and ground contacts arranged in one or more rows for mating with contact pads at the edge of the circuit card. The circuit card is plugged into the card slot in a mating direction. The mating ends of the contacts are typically cup shaped having curved ends to prevent mechanical stubbing of the tips of the contacts on the edge of the circuit card as the circuit card is plugged into the card slot. The curved tips create electrical stubs at the ends of the signal contacts, which negatively affect the electrical performance of the electrical connector.

Accordingly, there is a need for robust electrical contacts having improved performance.

BRIEF DESCRIPTION OF THE INVENTION

In one embodiment, a contact assembly for an electrical connector is provided and includes an array of contacts including signal contacts and ground contacts. The ground contacts are interspersed with the signal contacts to provide electrical shielding between corresponding signal contacts. Each signal contact includes a signal contact body having a first side, a second side opposite the first side, a first edge between the first and second sides, and a second edge between the first and second sides opposite the first edge. The signal contact body includes a signal mating end and a signal terminating end. Each signal contact includes a mating ball formed at the signal mating end of the signal contact body. The mating ball is generally spherical shaped. The mating ball and the signal contact body are a homogeneous structure.

In another embodiment, an electrical connector is provided and includes a housing having a cavity. The housing has a card slot at a mating end of the housing. The card slot is configured to receive a card edge of a circuit card. The electrical connector includes a contact assembly received in the cavity. The contact assembly includes an array of contacts including signal contacts and ground contacts. The ground contacts are interspersed with the signal contacts to provide electrical shielding between corresponding signal contacts. Each signal contact includes a signal contact body having a first side, a second side opposite the first side, a first edge between the first and second sides, and a second edge between the first and second sides opposite the first edge. The signal contact body includes a signal mating end and a signal terminating end, each signal contact includes a mating ball formed at the signal mating end of the signal contact body. The mating ball is generally spherical shaped. The mating ball includes a mating interface configured to engage a corresponding contact pad on a surface of the circuit card. The mating ball and the signal contact body are a homogeneous structure.

In a further embodiment, a method of forming a contact for a contact assembly is provided. The method stamps the contact from a metal blank to form a contact body having a first side, a second side opposite the first side, a first edge between the first and second sides, and a second edge between the first and second sides opposite the first edge. The contact body includes a mating end and a terminating end. The method generates an electrical arc and directing the electrical arc at the mating end to form a molted ball at a distal tip of the contact. The method cools the molten ball using a cooling airflow directed across the molten ball to form a mating ball at the distal tip of the contact having a generally spherical shape. The mating ball and the contact body are a homogeneous structure.

DETAILED DESCRIPTION OF THE INVENTION

Figure 1:
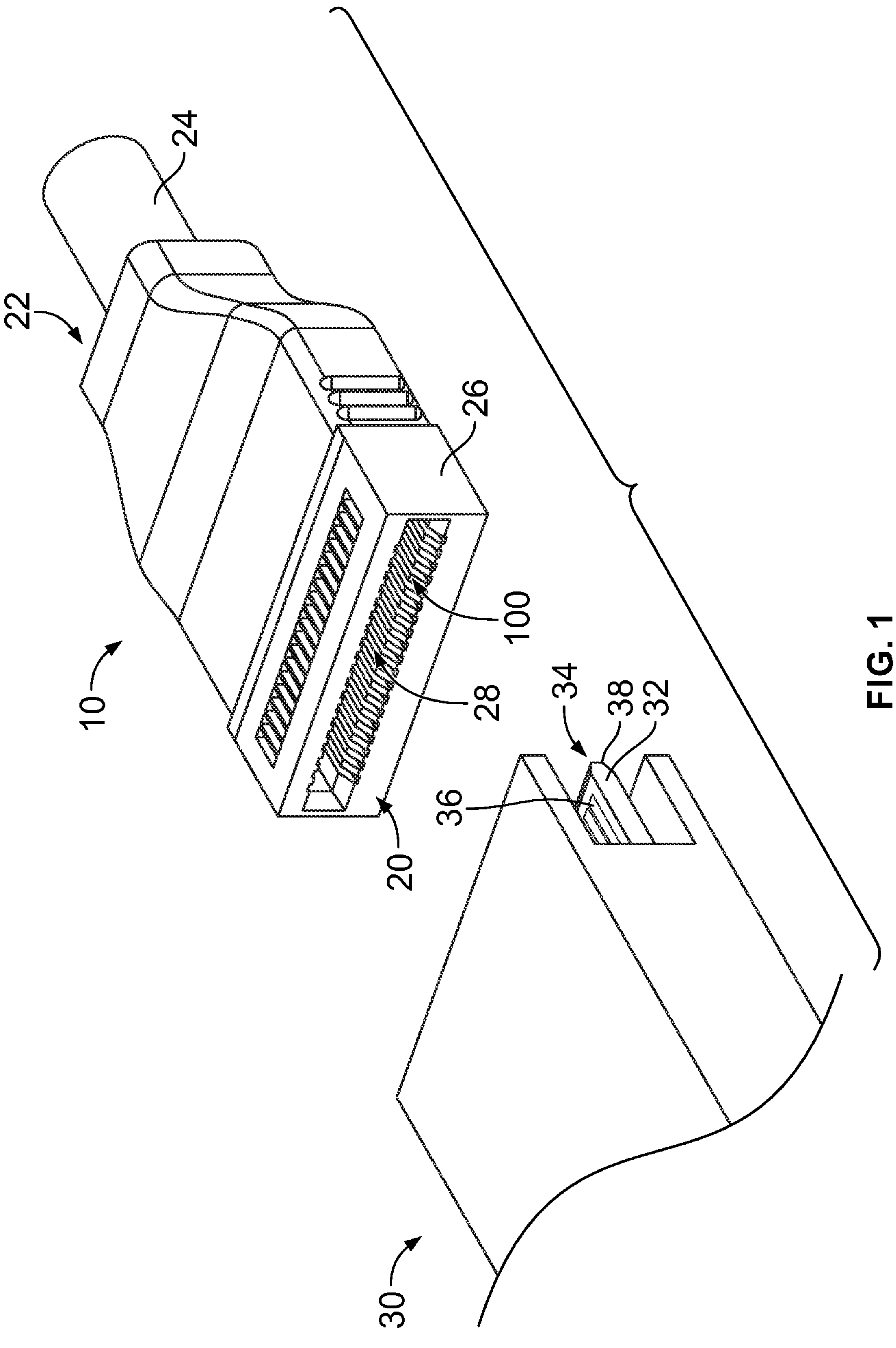
FIG. 1 is a perspective view of an electrical connector formed in accordance with one embodiment.

FIG. 1 is a perspective view of an electrical connector 10 formed in accordance with one embodiment. The electrical connector 10 is configured to be mated with a mating electrical connector 30. In an exemplary embodiment, the electrical connector 10 has a mating end 20, a cable end 22, and one or more cables 24 extending from the cable end 22. The electrical connector 10 includes a housing 26 configured to hold a contact assembly 100. In an exemplary embodiment, the housing 26 includes a card slot 28 at the mating end 20. In the illustrated embodiment, the electrical connector 10 is a communication device, such as a serial attached SCSI (SAS) connector. However, the electrical connector 10 may be another type of electrical connector in an alternative embodiment. For example, the electrical connector 10 may define a socket or receptacle connector, such as a card edge socket connector.

The mating electrical connector 30 is configured to be mated with the electrical connector 10. In an exemplary embodiment, the mating electrical connector 30 has a circuit card 32 at a mating end 34 of the mating electrical connector 30. The circuit card 32 includes mating contacts 36 at a card edge 38 of the circuit card 32. The mating contacts 36 may be provided at both sides of the circuit card 32. The connectors 10, 30 may be a high-speed connectors that transmit data signals at speeds over 10 gigabits per second (Gbps), such as over 25 Gbps. The connectors 10, 30 may be input-output (I/O) connectors.

Figure 2:
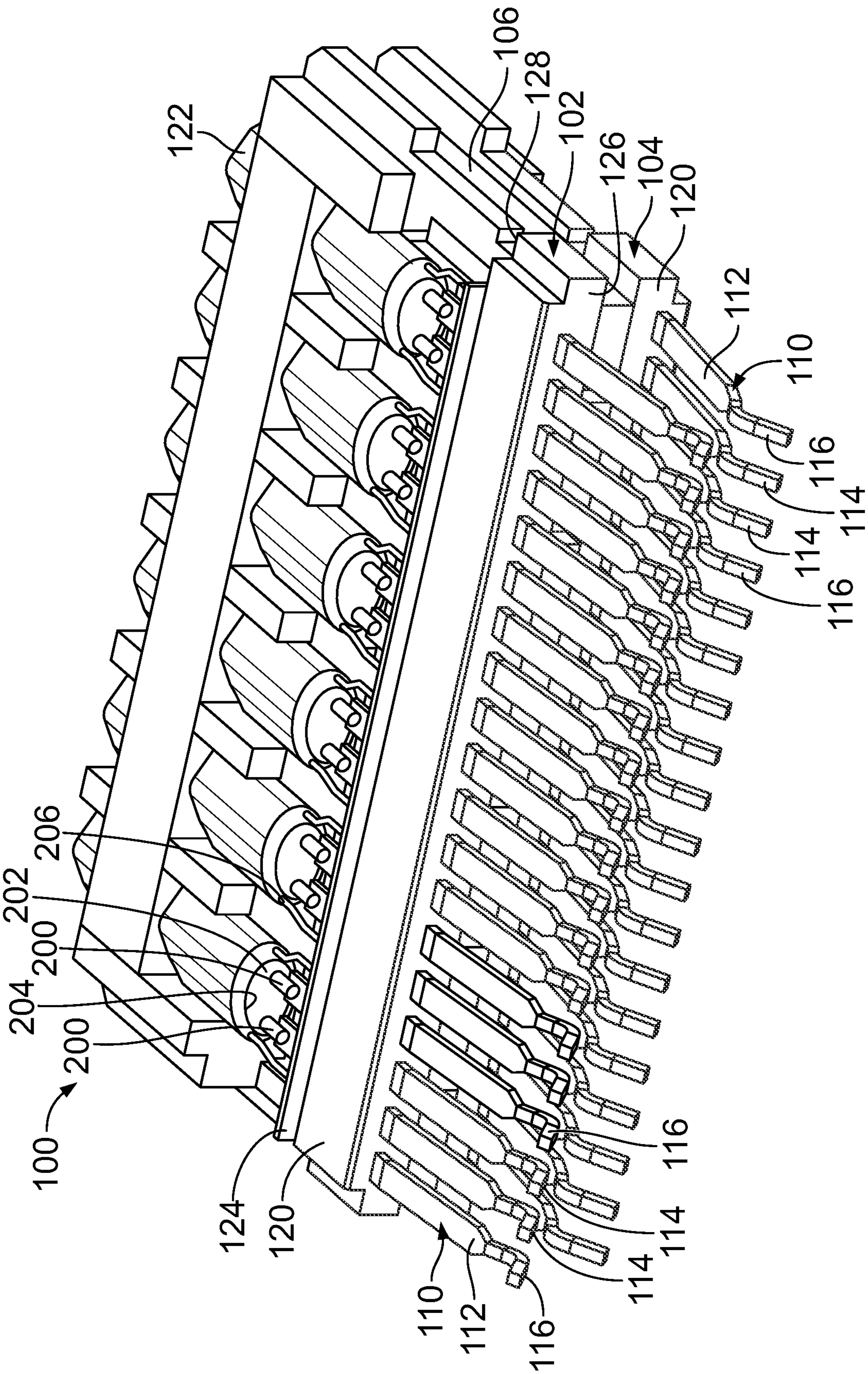
FIG. 2 is a perspective view of the contact assembly formed in accordance with one embodiment.

FIG. 2 is a perspective view of the contact assembly 100 formed in accordance with one embodiment. In an exemplary embodiment, the contact assembly 100 includes an upper contact subassembly 102 and a lower contact subassembly 104 coupled to a frame 106. The frame 106 supports the upper and lower contact subassemblies 102, 104. Optionally, the upper and lower contact subassemblies 102,

104 may be identical to each other and inverted 180°. In alternative embodiments, the contact assembly 100 may be provided without the frame 106, rather having the upper and lower contact assemblies coupled directly to each other without an intervening supporting structure. In other alternative embodiments, the contact assembly 100 may be provided with a single contact subassembly, such as provided without the lower contact subassembly 104.

The description herein may be made specifically to the “upper” contact subassembly 102 with the qualifier “upper” and may be made specifically to the “lower” contact subassembly 104 with the qualifier “lower” or may be made generically to the upper or the lower contact subassemblies 102, 104 without use of the qualifiers “upper” or “lower”.

The contact assembly 100 includes a leadframe 110 having an array of contacts 112 including signal contacts 114 and ground contacts 116. The contact assembly 100 includes a contact holder 120 holding the array of contacts 112. The contact assembly 100 includes cables 122 terminated to the leadframe 110. The contact assembly 100 includes a ground bus 124 provided to electrically common the ground contacts 116 and the cables 122. In an alternative embodiment, rather than being a cabled contact assembly, the contact assembly 100 may be configured to be terminated to a circuit board, such as being soldered or press-fit to the circuit board.

In an exemplary embodiment, the cables 122 are twin-axial cables. Each cable 122 include a pair of signal conductors 250 arranged in an insulator 252, shown in more detail in FIG. 5. A cable shield 254 surrounds the insulator 252 to provide electrical shielding for the signal conductors 250. The cable 122 includes one or more drain wires 256 electrically connected to the cable shield 254. Other types of cables 122 may be used in alternative embodiments, such as coaxial cables.

The contact holder 120 is used to hold the contacts 112, including the signal contacts 114 and the ground contacts 116. The contact holder 120 is manufactured from a dielectric material to electrically isolate the contacts 112 from each other. In an exemplary embodiment, the contact holder 120 is overmolded over the leadframe 110 to encase portions of the contacts 112 and hold relative positions of the contacts 112. The contact holder 120 extends between a front 126 and a rear 128.

In an exemplary embodiment, the contacts 112 are arranged in one or more rows. For example, the upper contacts 112 are arranged in an upper row configured to interface with an upper surface of a circuit card, such as the circuit card 32, and the lower contacts 112 are arranged in a lower row configured to interface with a lower surface of the circuit card 32. In an exemplary embodiment, the signal contacts 114 are arranged in pairs, such as differential pairs. The ground contacts 116 are interspersed between the signal contacts 114, such as between the pairs of the signal contacts 114, to provide electrical shielding between the corresponding signal contacts 114.

Figure 3:
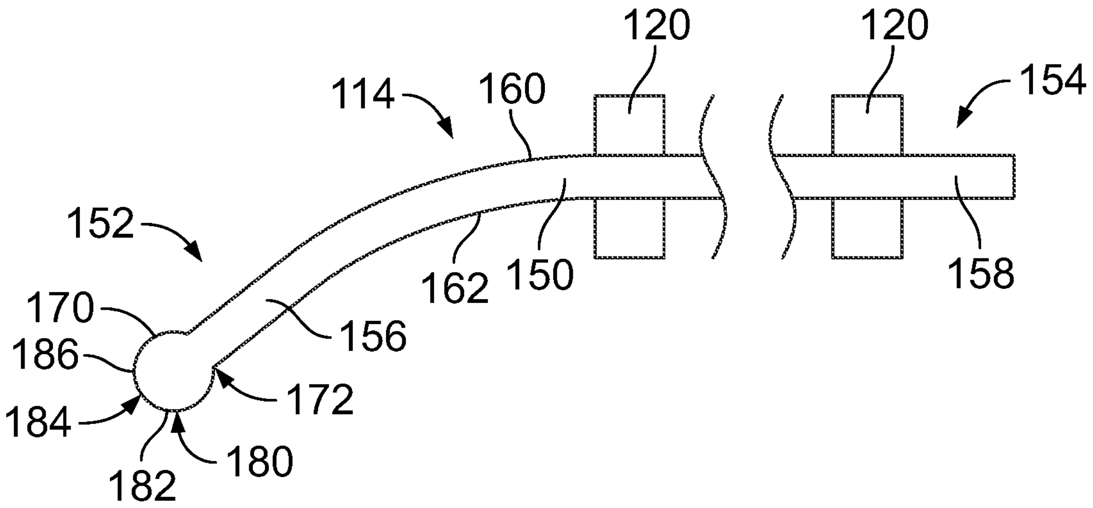
FIG. 3 is a side view of the signal contact formed in accordance with one embodiment.
Figure 4:
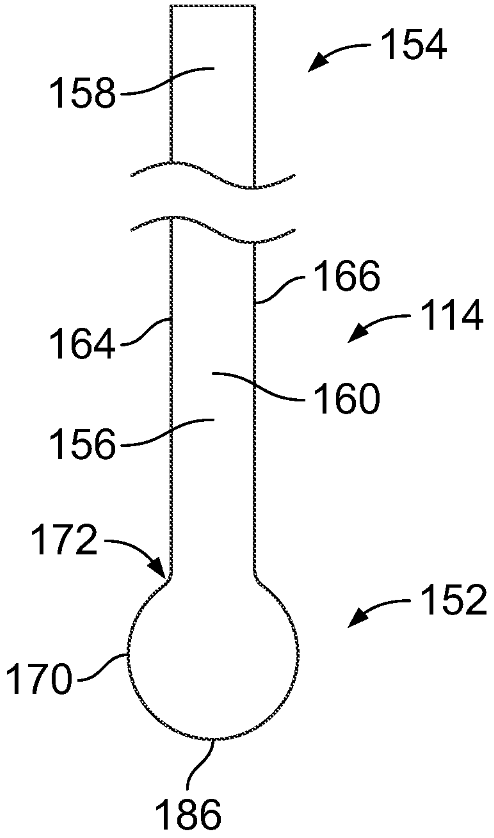
FIG. 4 is a top view of the signal contact formed in accordance with one embodiment.

With additional reference to FIG. 3, which is a side view of the signal contact 114, and FIG. 4, which is a top view of the signal contact 114, each signal contact 114 includes a signal contact body 150 extending between a signal mating end 152 and a signal terminating end 154. The contact holder 120 holds the signal contact bodies 150 relative to each other. The contact holder 120 maintains spacing between the signal contacts 114. The signal mating ends 152 are located forward of the contact holder 120. The signal terminating ends 154 are located rearward of the contact holder 120. In an exemplary embodiment, the signal contacts 114 include spring beams 156 at the signal mating ends 152. The spring beams 156 are deflectable spring beams. The spring beams 156 are configured to be coupled to the circuit card 32. In an exemplary embodiment, the signal contacts 114 include pads 158 at the signal terminating ends 154. The pads 158 are configured to be welded or soldered to the signal conductors 250 of the cables 122. The signal terminating ends 154 may include other connection means in alternative embodiments, such as crimp barrels, insulating displacement features, and the like for electrical connection to the signal conductors 250. In alternative embodiments, the signal terminating ends 154 may include terminating features for terminating the signal contacts 114 to a circuit board, such as solder tails or press-fit pins.

In an exemplary embodiment, the signal contact 114 is a stamped and formed contact. The signal contact body 150 is stamped from a metal sheet or blank. The signal contact body 150 includes a first side 160 and a second side 162 opposite the first side 160. The signal contact body 150 includes a first edge 164 between the first and second sides 160, 162 and a second edge 166 between the first and second sides 160, 162. The second edge 166 is opposite the first edge 164. In an exemplary embodiment, the signal contact body 150 has a rectangular cross-section. The sides 160, 162 may be wider than the edges 164, 166. The edges 164, 166 may be the cut edges formed during the stamping process.

The signal contact 114 includes a signal mating ball 170 formed at the signal mating end 152. In an exemplary embodiment, the signal mating ball 170 and the signal contact body 150 are a homogeneous structure. For example, the signal mating ball 170 is integral with the spring beam 156 being a unitary, monolithic structure. In an exemplary embodiment, the signal mating ball 170 is formed from the signal mating end 152. For example, the end of the spring beam 156 may be heated to a molten state to form a molten ball at the distal end and then cooled to cure and fix the signal mating ball 170 at the distal end of the signal contact 114. The signal mating ball 170 is not solder applied to the end of the spring beam 156. Rather, the signal mating ball 170 has the same chemical composition as the signal contact body 150. As such, the signal mating ball 170 is mechanically, rigidly fixed at the distal end of the signal contact 114, which allows repeated mating to and unmated from the circuit card 32. The structural integrity of the signal mating ball 170 at the end of the signal contact 114 is maintained through multiple mating cycles. The integrity of the signal mating ball 170 is not affected by heating, such as during operation or use of the electrical connector 10. The signal path through the signal mating ball 170 and the spring beam 156 is seamless. The signal path does not transition across dissimilar conductive structures, as would be the case with the use of a solder ball, leading to a robust electrical conductor for signal conduction through the signal contact 114.

The signal mating ball 170 is generally spherical shaped. For example, the signal mating ball 170 has a circular cross section. In an exemplary embodiment, the signal mating ball 170 is enlarged relative to the signal contact body 150. For example, the signal mating ball 170 has a diameter greater than a width of the first and second sides 160, 162 and greater than a width of the first and second edges 164, 166. The mating ball 170 has a transition portion 172 that transitions an exterior of the mating ball 170 to an exterior of the signal contact body 150. The transition portion 172 may include curved surfaces transitioning to the first side 160, the second side 162, the first edge 164, and the second edge 166.

The signal mating ball 170 has a curved mating interface 180, such as at a bottom 182 of the signal mating ball 170. The curved mating interface 180 provides a small surface area (for example, a point) configured to interface with the circuit card 32. The signal mating ball 170 includes a curved surface 184 between the mating interface 180 at the bottom 182 and a distal tip 186 of the signal contact 114. The curved surface 184 is a wiping surface configured to engage the circuit card 32 during mating. The curved surface 184 provides a smooth transition interface along the signal mating ball 170 as the circuit card 32 is loaded into the electrical connector 10. The curved surface 184 prevents mechanical stubbing during mating. The signal mating ball 170 has a short, almost non-existent electrical stub rearward of the mating interface 180. The short electrical stub enhances electrical performance of the signal contact 114 by reducing effect of resonance of the signals through the signal contact 114.

Figure 5:
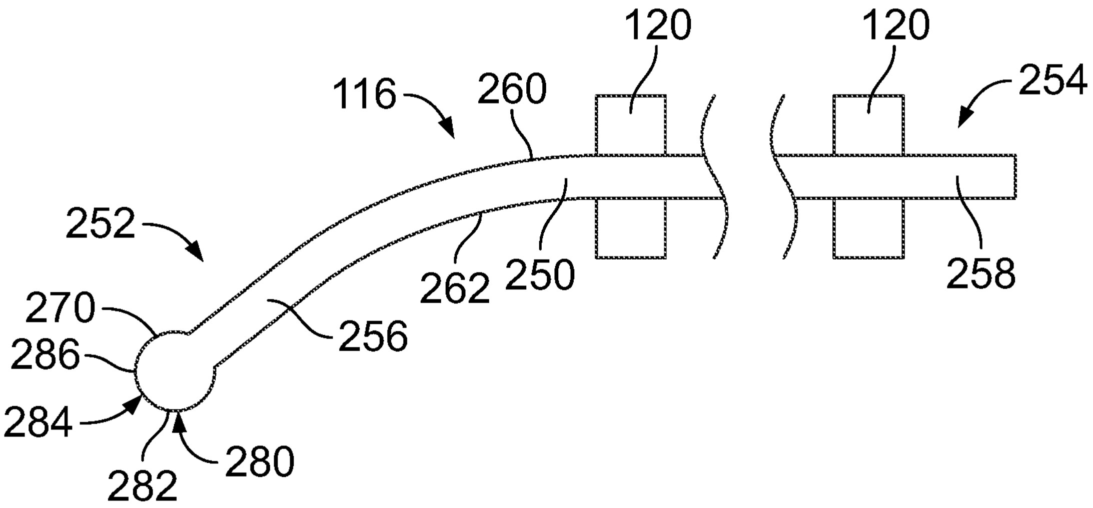
FIG. 5 is a side view of the ground contact formed in accordance with one embodiment.
Figure 6:
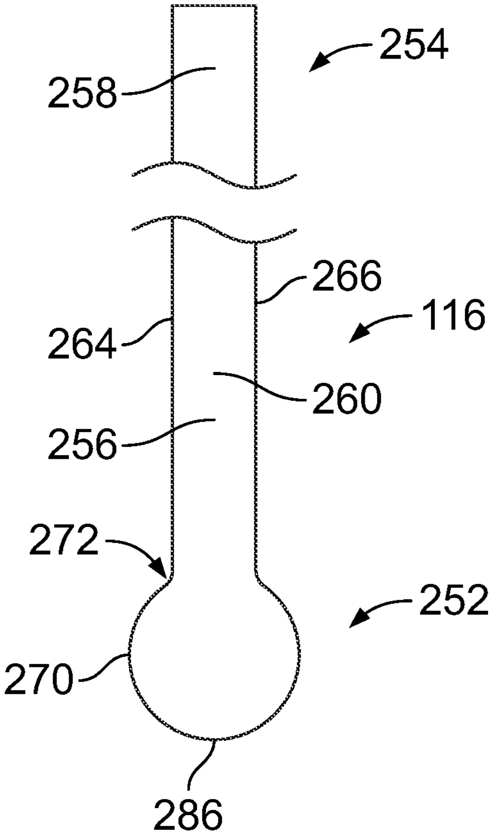
FIG. 6 is a top view of the ground contact formed in accordance with one embodiment.

With additional reference to FIG. 5, which is a side view of the ground contact 116, and FIG. 6, which is a top view of the ground contact 116, each ground contact 116 includes a ground contact body 250 extending between a ground mating end 252 and a ground terminating end 254. The contact holder 120 holds the ground contact bodies 250 relative to each other and relative to the signal contact bodies 150. The ground mating ends 252 are located forward of the contact holder 120. The ground terminating ends 254 are located rearward of the contact holder 120. In an exemplary embodiment, the ground contacts 116 include spring beams 256 at the ground mating ends 252. The spring beams 256 are deflectable spring beams. The spring beams 256 are configured to be electrically connected to the circuit card 32. In an exemplary embodiment, the ground contacts 116 include pads 258 at the ground terminating ends 254. The pads 258 are configured to be welded or soldered to the drain wires 256 or cable shields 254 of the cables 122 to electrically common the cables 122 and the leadframe 110. In alternative embodiments, the ground terminating ends 254 may include terminating features for terminating the ground contacts 116 to a circuit board, such as solder tails or press-fit pins.

In an exemplary embodiment, the ground contact 116 is a stamped and formed contact. The ground contact body 250 is stamped from a metal sheet or blank, and may be stamped with the signal contact bodies 150 to form the leadframe. The ground contact body 250 may be formed identical to the signal contact body 150. The ground contact body 250 includes a first side 260 and a second side 262 opposite the first side 260. The ground contact body 250 includes a first edge 264 between the first and second sides 260, 262 and a second edge 266 between the first and second sides 260, 262. The second edge 266 is opposite the first edge 264. In an exemplary embodiment, the ground contact body 250 has a rectangular cross-section. The sides 260, 262 may be wider than the edges 264, 266. The edges 264, 266 may be the cut edges formed during the stamping process.

The ground contact 116 includes a ground mating ball 270 formed at the ground mating end 252. The ground mating ball 270 may be formed identical to the signal mating ball 170. In alternative embodiments, the ground contact 116 may be provided without the ground mating ball 270. Rather, the distal end of the ground contact 116 may include a cupped or spoon shaped curved mating finger.

In an exemplary embodiment, the ground mating ball 270 and the ground contact body 250 are a homogeneous structure. For example, the ground mating ball 270 is integral with the spring beam 256 being a unitary, monolithic structure. In an exemplary embodiment, the ground mating ball 270 is formed from the ground mating end 252. For example, the end of the spring beam 256 may be heated to a molten state to form a molten ball at the distal end and then cooled to cure and fix the ground mating ball 270 at the distal end of the ground contact 116. The ground mating ball 270 is not solder applied to the end of the spring beam 256. Rather, the ground mating ball 270 has the same chemical composition as the ground contact body 250. As such, the ground mating ball 270 is mechanically, rigidly fixed at the distal end of the ground contact 116, which allows repeated mating to and unmated from the circuit card 32. The structural integrity of the ground mating ball 270 at the end of the ground contact 116 is maintained through multiple mating cycles. The integrity of the ground mating ball 270 is not affected by heating, such as during operation or use of the electrical connector 10. The ground path through the ground mating ball 270 and the spring beam 256 is seamless. The ground path does not transition across dissimilar conductive structures, as would be the case with the use of a solder ball, leading to a robust electrical conductor for ground conduction through the ground contact 116.

The ground mating ball 270 is generally spherical shaped. For example, the ground mating ball 270 has a circular cross section. In an exemplary embodiment, the ground mating ball 270 is enlarged relative to the ground contact body 250. For example, the ground mating ball 270 has a diameter greater than a width of the first and second sides 260, 262 and greater than a width of the first and second edges 264, 266. The mating ball 270 has a transition portion 272 that transitions an exterior of the mating ball 270 to an exterior of the ground contact body 250. The transition portion 272 may include curved surfaces transitioning to the first side 260, the second side 262, the first edge 264, and the second edge 266.

The ground mating ball 270 has a curved mating interface 280, such as at a bottom 282 of the ground mating ball 270. The curved mating interface 280 provides a small surface area (for example, a point) configured to interface with the circuit card 32. The ground mating ball 270 includes a curved surface 284 between the mating interface 280 at the bottom 282 and a distal tip 286 of the ground contact 116. The curved surface 284 is a wiping surface configured to engage the circuit card 32 during mating. The curved surface 284 provides a smooth transition interface along the ground mating ball 270 as the circuit card 32 is loaded into the electrical connector 10. The curved surface 284 prevents mechanical stubbing during mating. The ground mating ball 270 has a short, almost non-existent electrical stub rearward of the mating interface 280. The short electrical stub enhances electrical performance of the ground contact 116 by reducing effect of resonance of the grounds through the ground contact 116.

With reference back to FIG. 2, in an exemplary embodiment, the ground bus 124 electrically commons each of the ground contacts 116 with each other. The drain wires 256, the cable shields 254, the ground contacts 116 and the ground bus 124 form a ground structure 258 of the electrical connector 10. The ground bus 124 is separate and discrete from the leadframe 110. Both the ground bus 124 and the leadframe 110 are electrically connected to the cable shields 254 of the cables 122 via the drain wires 256 to electrically common the cables 122 and the ground contacts 116. The ground bus 124 includes ground fingers 200 and a connecting beam 202 between the ground fingers 200. The ground fingers 200 are aligned with and coupled to the corresponding ground contacts 116. The connecting beam 202 extends between the ground fingers 200. The connecting beam 202 mechanically and electrically connects the ground fingers 200. The ground bus 124 electrically commons each of the ground contacts 116.

Figure 7:
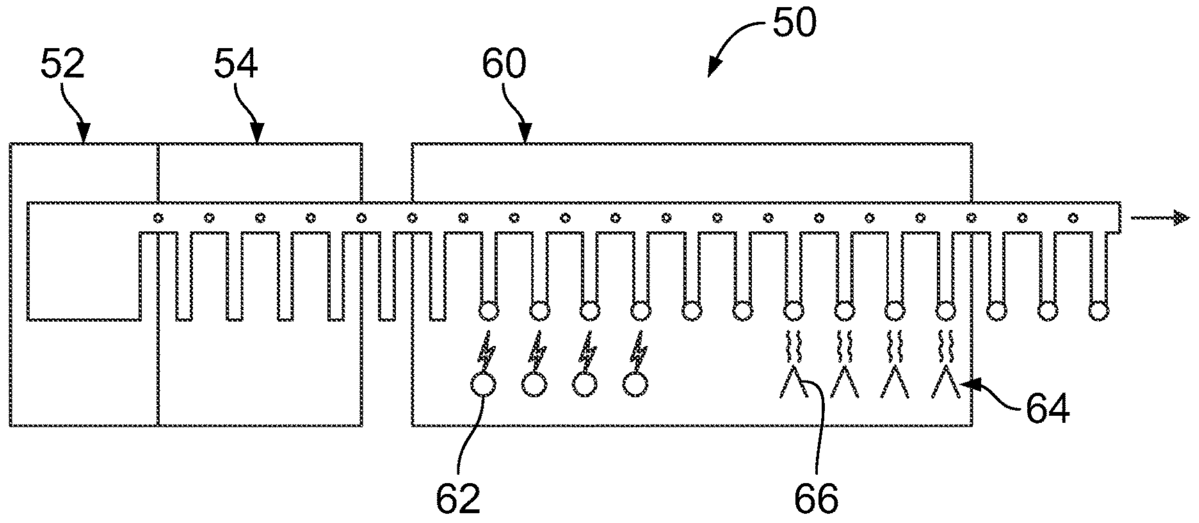
FIG. 7 is a schematic view of a system used to manufacture the signal and ground contacts in accordance with one embodiment.

FIG. 7 is a schematic view of a system 50 used to manufacture the signal and ground contacts 114, 116. The system 50 includes a stamping machine 52 used to stamp the contacts 114, 116 from a metal blank. For example, the array of contacts may be stamped from a single blank as part of a leadframe. The system 50 includes a forming machine 54 used to form the contacts 114, 116 into a predetermined shape. The contacts 114, 116 may include one or more bends after the forming process, such as to form the spring beams and/or to form the terminating ends relative to the mating ends. Optionally, the stamping machine 52 and the forming machine 54 may be incorporated into a single machine, such as a press machine.

The system 50 includes a ball forming machine 60. The ball forming machine may be integrated with the stamping machine 52 and/or the forming machine 54. The ball forming machine 60 includes an arc generator 62 for generating an electrical arc. The electrical arc is transmitted into the distal end of the contact to rapidly heat the distal end. In an exemplary embodiment, the arc generator 62 transforms the distal end of the contact into a molten state. The shape of the metal material may change when in the molten state, such as from a rectangular shape to a spherical shape. In an exemplary embodiment, the ball forming machine 60 may include multiple arc generators 62 for generating arcs in multiple contacts simultaneously, such as in all of the contacts of the leadframe. Alternatively, the ball forming machine 60 may include a single arc generator 62 used to form the balls one at a time. The arc generator 62 forms a molten ball at the distal end of the contact. The molten ball is cooled to retain the spherical shape and form a ball at the distal end of the contact (for example, to form the signal mating ball 170 or the ground mating ball 270).

In an exemplary embodiment, the ball forming machine 60 includes a cooling device 64 used to rapidly cool the molten ball to retain the ball or spherical shape at the distal end of the contact. The cooling device 64 includes a nozzle 66 used to direct the flow of gas (for example, air or other cooling gas) across the molten ball. In an exemplary embodiment, the ball forming machine 60 may include multiple cooling devices 64 and/or multiple nozzles 66 for generating the cooling gas flow for the contacts, such as one for each of the contacts of the leadframe. In alternative embodiments, the ball forming machine 60 may include a single cooling device and/or a single nozzle 66, which may be used to simultaneously cool all of the contacts or which may cool the contacts one at a time.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A contact assembly for an electrical connector comprising:

an array of contacts including signal contacts and ground contacts, the ground contacts interspersed with the signal contacts to provide electrical shielding between corresponding signal contacts;

each signal contact including a signal contact body having a first side, a second side opposite the first side, a first edge between the first and second sides, and a second edge between the first and second sides opposite the first edge, the signal contact body including a signal mating end and a signal terminating end;

each signal contact including a mating ball formed at the signal mating end of the signal contact body, the mating ball being generally spherical shaped;

wherein the mating ball and the signal contact body are a homogeneous structure.

2. The contact assembly of claim 1, wherein the signal contact body has a rectangular cross-section and the mating ball has a circular cross section.

3. The contact assembly of claim 1, wherein the mating ball includes a transition portion that transitions an exterior of the mating ball to an exterior of the signal contact body.

4. The contact assembly of claim 3, wherein the transition portion includes a curved surface transitioning to the first side, a curved surface transitioning to the second side, a curved surface transitioning to the first edge, and a curved surface transitioning to the second edge.

5. The contact assembly of claim 1, wherein the mating ball and the signal contact body form a unitary monolithic structure.

6. The contact assembly of claim 1, wherein the mating ball has a diameter greater than a width of the first side and greater than a width of the first edge.

7. The contact assembly of claim 1, wherein the mating ball has a curved mating interface.

8. The contact assembly of claim 1, wherein the mating ball is integral with the signal contact body.

9. The contact assembly of claim 1, wherein the mating ball has the same chemical composition as the signal contact body.

10. The contact assembly of claim 1, wherein each ground contact includes a ground contact body having a first side, a second side opposite the first side, a first edge between the first and second sides, and a second edge between the first and second sides opposite the first edge, the ground contact body including a ground mating end and a ground terminating end, each ground contact including a ground mating ball formed at the ground mating end of the ground contact body, the ground mating ball being generally spherical shaped, wherein the ground mating ball and the ground contact body are a homogeneous structure.

11. The contact assembly of claim 10, wherein the mating balls and the ground mating balls of the array of contacts are arranged in a row with signal mating interfaces of the mating balls and ground mating interfaces of the ground mating balls being coplanar.

12. The contact assembly of claim 1, wherein the mating ball is not solder.

13. The contact assembly of claim 1, wherein the mating ball is formed from the distal end of the signal contact body.

14. The contact assembly of claim 1, wherein the mating ball is formed by making the distal end of the signal contact body molten using an arc generator.

15. An electrical connector comprising:

a housing having a cavity, the housing having a card slot at a mating end of the housing, the card slot configured to receive a card edge of a circuit card; and a contact assembly received in the cavity, the contact assembly including an array of contacts including signal contacts and ground contacts, the ground contacts interspersed with the signal contacts to provide electrical shielding between corresponding signal contacts, each signal contact including a signal contact body having a first side, a second side opposite the first side, a first edge between the first and second sides, and a second edge between the first and second sides opposite the first edge, the signal contact body including a signal mating end and a signal terminating end, each signal contact including a mating ball formed at the signal mating end of the signal contact body, the mating ball being generally spherical shaped, the mating ball including a mating interface configured to engage a corresponding contact pad on a surface of the circuit card, wherein the mating ball and the signal contact body are a homogeneous structure.

16. The electrical connector of claim 15, wherein the signal contact body has a rectangular cross-section and the mating ball has a circular cross section, the mating ball including a transition portion that transitions an exterior of the circular mating ball to an exterior of the rectangular signal contact body.

17. The electrical connector of claim 15, wherein the mating ball has the same chemical composition as the signal contact body.

18. The electrical connector of claim 15, wherein each ground contact includes a ground contact body having a first side, a second side opposite the first side, a first edge between the first and second sides, and a second edge between the first and second sides opposite the first edge, the ground contact body including a ground mating end and a ground terminating end, each ground contact including a ground mating ball formed at the ground mating end of the ground contact body, the ground mating ball being generally spherical shaped, wherein the ground mating ball and the ground contact body are a homogeneous structure.

19. The electrical connector of claim 15, wherein the ground contacts and the signal contacts are arranged in an upper row and a lower row for interfacing with upper and lower surfaces of the circuit card, respectively.

20. A method of forming contacts for a contact assembly, the method comprising:

stamping the contacts from a metal blank, each contact having a contact body having a first side, a second side opposite the first side, a first edge between the first and second sides, and a second edge between the first and second sides opposite the first edge, the contact body including a mating end and a terminating end;

generating an electrical arc and directing the electrical arc at the mating end to form a molten ball at a distal tip of the contact; and cooling the molten ball using a cooling airflow directed across the molten ball to form a mating ball at the distal tip of the contact having a generally spherical shape;

wherein the mating ball and the contact body are a homogeneous structure.

* * * * *